(12) United States Patent
Narang et al.

(10) Patent No.: US 11,734,616 B2
(45) Date of Patent: Aug. 22, 2023

(54) METHOD AND SYSTEM FOR ACCESS CONTROL OF SHARED SPACES THROUGH BLOCKCHAIN

(71) Applicant: MASTERCARD INTERNATIONAL INCORPORATED, Purchase, NY (US)

(72) Inventors: Bhupinder Singh Narang, Gurgaon (IN); Ashish Jain, Gurgaon (IN); Pulkit Gupta, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 874 days.

(21) Appl. No.: 16/509,610

(22) Filed: Jul. 12, 2019

(65) Prior Publication Data

US 2021/0012248 A1   Jan. 14, 2021

(51) Int. Cl.
*G06Q 10/02* (2012.01)
*H04L 9/32* (2006.01)
(Continued)

(52) U.S. Cl.
CPC ......... *G06Q 10/02* (2013.01); *G07C 9/00896* (2013.01); *H04L 9/30* (2013.01);
(Continued)

(58) Field of Classification Search
CPC .............. G06Q 10/02; G06Q 2220/10; G07C 9/00896; G07C 9/00571; G07C 2209/08;
(Continued)

(56) References Cited

U.S. PATENT DOCUMENTS

2014/0002236 A1* 1/2014 Pineau ............... G07C 9/00309
340/5.6
2018/0189730 A1* 7/2018 Wilkinson .............. G07F 17/13
(Continued)

FOREIGN PATENT DOCUMENTS

| CN | 109543869 B  * | 6/2021 | ............. G06Q 10/02 |
| EP | 3598363 A1 * | 1/2020 | ......... G06Q 20/3829 |

OTHER PUBLICATIONS

CN-109543869-B; "Hotel Booking Settlement Method, Device And System Based On Blockchain"; English Translation; Date Filed: Nov. 27, 2018; (Year: 2018).*

*Primary Examiner* — Mamon Obeid
*Assistant Examiner* — Edgar R. Martinez-Hernandez
(74) *Attorney, Agent, or Firm* — Panitch Schwarze Belisario & Nadel LLP

(57) ABSTRACT

A method for reserving access to a shared space through use of a blockchain and smart contracts includes: storing a blockchain including a plurality of blocks, each block including a block header and one or more blockchain data values, wherein one of the one or more blockchain data values included in one of the plurality of blocks includes a smart contract including at least an identifier and one or more terms; receiving a reservation request, wherein the reservation request includes at least the identifier, a reservation time, a public key of a cryptographic key pair, and a digital signature generated using the private key of the cryptographic key pair; validating the digital signature using the public key; executing the smart contract using the public key and the reservation time; and transmitting one or more data values to an internet-enabled device as part of the execution of the smart contract.

10 Claims, 5 Drawing Sheets

(51) Int. Cl.
*H04L 9/30* (2006.01)
*G07C 9/00* (2020.01)
*H04L 9/00* (2022.01)

(52) U.S. Cl.
CPC .......... *H04L 9/3228* (2013.01); *H04L 9/3239* (2013.01); *H04L 9/3247* (2013.01); *H04L 9/3297* (2013.01); *G06Q 2220/10* (2013.01); *G07C 9/00571* (2013.01); *G07C 2209/08* (2013.01); *H04L 9/50* (2022.05)

(58) Field of Classification Search
CPC ....... H04L 9/30; H04L 9/3228; H04L 9/3239; H04L 9/3247; H04L 9/3297; H04L 2209/38
See application file for complete search history.

(56) References Cited

U.S. PATENT DOCUMENTS

| | | | |
|---|---|---|---|
| 2018/0268617 A1* | 9/2018 | Bruce | G08G 1/146 |
| 2019/0147674 A1* | 5/2019 | Choi | G06Q 10/02 |
| | | | 705/5 |
| 2019/0156440 A1* | 5/2019 | Wang | H04L 9/3297 |
| 2020/0104891 A1* | 4/2020 | Rule | G06Q 20/322 |
| 2020/0117690 A1* | 4/2020 | Tran | G06F 16/90332 |
| 2020/0167365 A1* | 5/2020 | Troia | H04L 67/104 |
| 2020/0244463 A1* | 7/2020 | Wilson | H04L 9/0637 |
| 2020/0393254 A1* | 12/2020 | Gardner | G01C 21/3438 |
| 2021/0287540 A1* | 9/2021 | Kojima | G06Q 10/02 |

\* cited by examiner

METHOD AND SYSTEM FOR ACCESS CONTROL OF SHARED SPACES THROUGH BLOCKCHAIN

FIELD

The present disclosure relates to the controlling of access to shared spaces through blockchain, specifically the use of a blockchain and smart controls to track and control access to and use of shared spaces.

BACKGROUND

Common areas exist in many capacities. For instance, offices often have conference and presentation rooms that can be used by multiple tenants and must be reserved in advance. In other example, apartment complexes and other living communities may have a clubhouse, recreational spaces, etc., where residents may reserve them in advance to guarantee their usage and/or to exclude others. In many cases, an employee or other individual may be put in charge of managing the reservations for such spaces, and for monitoring use of these spaces following a reservation.

In an effort to streamline the process and reduce the involvement of personnel, many systems have been developed that enable individuals or entities to reserve common areas in an automated fashion. For instance, web pages and application programs can often be used to reserve common areas. In an example, an office building with conference rooms may have a web page available where entities can select times and dates to reserve the conference rooms and reserve them automatically, where reserved times may be blocked out when other entities check in the future. Also, Outlook® 2010 has this functionality in a closed system.

While such systems can improve the reservation process, they often rely on individuals that control access to and monitor use of the reserved common areas. This need for human intervention can lead to a myriad of problems, such as the individual being late or absent, which can delay or ruin the use of a common area. In addition, the use of a basic reservation system can be prone to hacking, error, or tampering, leading to unauthorized reservations, the removal or reservations, and other nefarious acts. Further still, such systems often proprietary, have access controls and other restrictions that are not always necessary (e.g., such as in reserving public spaces e.g., a county tennis court, camping spaces in federal parks, etc.). Thus, there is a need for an automatic reservation system, for shared spaces for the controlling of access thereto that is resistant to tampering and may be widely available for multiple forums, which is no possible due to the technical limitations of current systems mentioned above.

SUMMARY

The present disclosure provides a description of systems and methods for reserving access to a shared space through the use of a blockchain and smart contracts. A smart contract is added to a blockchain for a shared space, where the smart contract sets out terms and conditions for use of the shared space. Any time an entity wants to reserve use of the shared space, they must therefore agree to the terms and conditions in the smart contract. When the entity reserves the shared space, they do so through providing information from their own blockchain wallet, and the smart contract executes on the blockchain. Execution of the smart contract results in an internet-enabled device receiving the blockchain wallet information for the reserving entity. Thus, when the entity desires access to the shared space as part of their reservation, they need only present their blockchain wallet to the internet-enabled device, reducing the need to involve physical personnel. Because blockchains are immutable, all actions regarding the smart contract and execution thereof are documented in a manner that cannot be tampered with or changed, providing immutable proof of a party's acceptance of the terms and conditions and of their reservation, preventing conflicts and providing a clear, auditable record should any arise. As a result, the methods and systems discussed herein enable automatically controlled access to shared spaces and in a manner that is auditable and reliable through the use of a blockchain and smart contracts. It is also capable of being used for multiple forums controlled by different entities, and without requiring additional security protections and controls in many circumstances.

A method for reserving access to a shared space through use of a blockchain and smart contracts includes: storing, in a memory of a node in a blockchain network, a blockchain, the blockchain including at least a plurality of blocks, each block including at least a block header and one or more blockchain data values, wherein one of the one or more blockchain data values included in one of the plurality of blocks includes a smart contract including at least an identifier and one or more terms; receiving, by a receiver of the node, a reservation request, wherein the reservation request includes at least the identifier, a reservation time, a public key of a cryptographic key pair, and a digital signature generated using the private key of the cryptographic key pair; validating, by a processing device of the node, the digital signature using the public key; executing, by the processing device of the node, the smart contract using at least the public key and the reservation time; and transmitting, by a transmitter of the node, one or more data values to an internet-enabled device as part of the execution of the smart contract.

A system for reserving access to a shared space through use of a blockchain and smart contracts includes: a memory of a node in a blockchain network configured to store a blockchain, the blockchain including at least a plurality of blocks, each block including at least a block header and one or more blockchain data values, wherein one of the one or more blockchain data values included in one of the plurality of blocks includes a smart contract including at least an identifier and one or more terms; a receiver of the node configured to receive a reservation request, wherein the reservation request includes at least the identifier, a reservation time, a public key of a cryptographic key pair, and a digital signature generated using the private key of the cryptographic key pair; a processing device of the node configured to validate the digital signature using the public key, and execute the smart contract using at least the public key and the reservation time; and a transmitter of the node configured to transmit one or more data values to an internet-enabled device as part of the execution of the smart contract.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Controlling Access to Shared Spaces Through Blockchain

Figure 1:
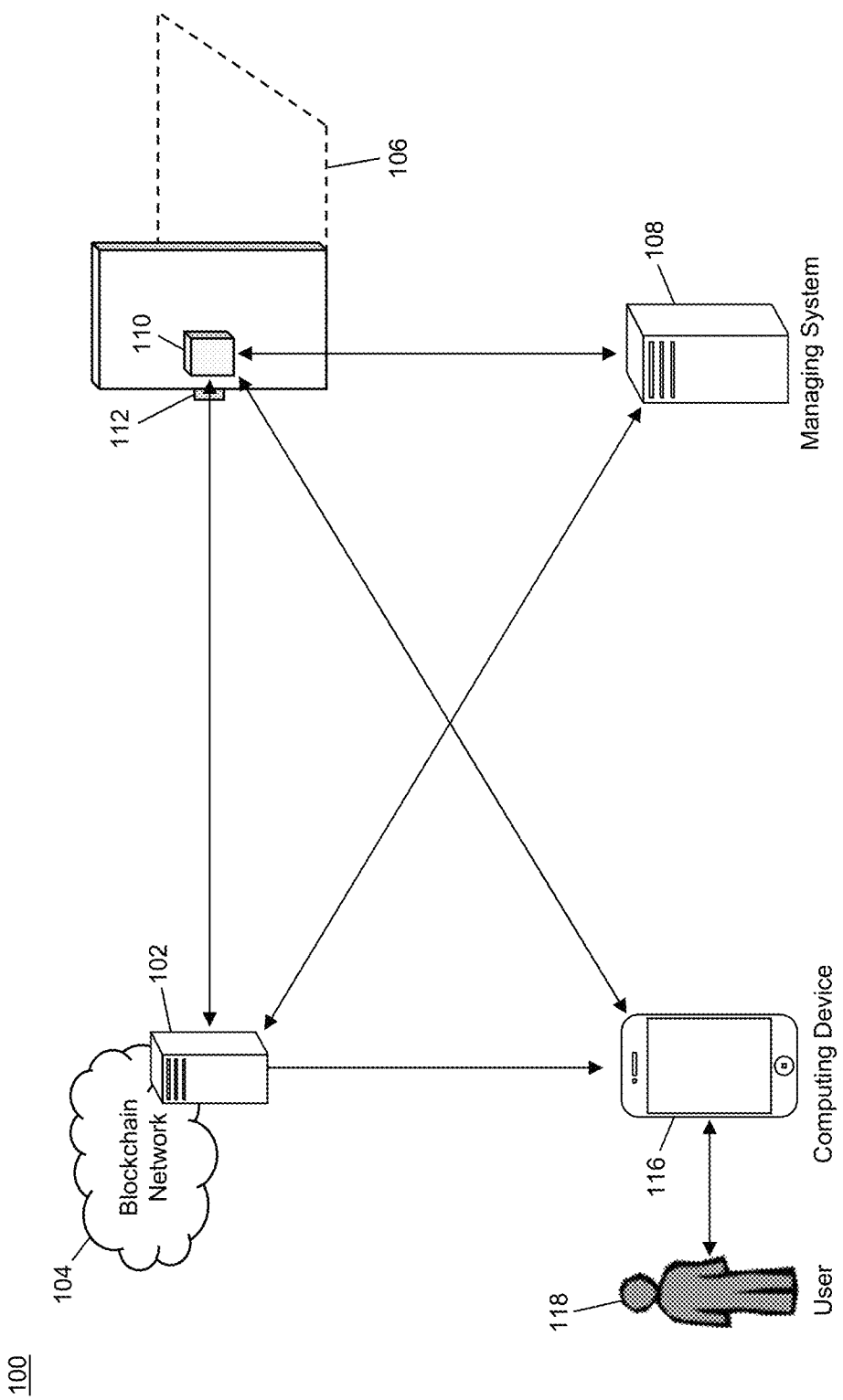
FIG. 1 is a block diagram illustrating a high level system architecture for controlling access to shared spaces through blockchain in accordance with exemplary embodiments.

FIG. 1 illustrates a system 100 for the controlling of access to a shared space through the use of a blockchain and smart contract.

The system 100 may include a blockchain network 104. The blockchain network 104 may be comprised of a plurality of nodes 102. Each node 102, discussed in more detail below, may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

The blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to the computing device that stores the private key for use thereof in blockchain transactions.

A blockchain data value stored in the blockchain may correspond to a blockchain transaction. A blockchain transaction may consist of at least: a digital signature of the sender of currency that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the processing of a blockchain transaction, such data may be provided to a node 102 in the blockchain network 104, either by the sender or the recipient. The node 102 may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes 102 in the blockchain network 104 before being added to the blockchain and distributed to all of the nodes 102 in the blockchain network 104.

In the system 100, blockchain data values may also be used to store smart contracts and additional data related thereto. A smart contract may be an executable script that is stored in the blockchain that is configured to self-execute once one or more criteria are met. The smart contract may monitor for fulfillment of the criteria, then, once the criteria has been fulfilled, self-execute to perform one or more functions based on the content of the smart contract.

The system 100 may include a shared space 106. The shared space 106 may be a common area or other physical area where access to the area is controlled. In the system 100, a managing system 108 may be used in conjunction with the control of access to the shared space 106. The managing system 108 may be a computing system that is internet-enabled and configured to communicate with an internet-enabled device 110. The internet-enabled device 110 may be configured to control access to the shared space 106, such as through an electronic locking mechanism 112. The electronic locking mechanism 112 may be a lock that prevents access to the shared space 106 until opened, where the internet-enabled device 110 may be a computing device that is configured to monitor the blockchain and actions related thereto as part of the controlling of the electronic locking mechanism 112. The internet-enabled device 110 may be any type of device suitable for performing the functions discussed herein.

In the system 100, a smart contract may be submitted to a node 102 in the blockchain network 104, such as by the managing system 108 or internet-enabled device, and added to the blockchain. The smart contract may include at least an identifier and one or more terms. The identifier may be a unique value that is associated with the smart contract, the internet-enable device 110, and/or the shared space 106. The one or more terms may be terms and conditions related to usage of the shared space 106 that must be agreed to for use of the shared space 106. The terms and conditions may include, for instance, access rules, time and/or date limitations or restrictions, pricing information, security information, cleaning information, technology information, occupancy rules, etc. In some instances, terms and conditions may include a condition that payment must be made as part of reserving the shared space 106. In such instances, the terms and conditions may include a public key associated with a blockchain wallet (e.g., operated by the internet-enabled device 110 or managing system 108) to which payment may be sent, a blockchain address to which cryptographic currency may be sent through a blockchain transaction, or an account number for a fiat transaction account that can be used to receive fiat currency.

In the system 100, a user 118 may be interested in reserving the shared space 106. The user 118 may possess or otherwise have access to a computing device 116. The computing device 116 may be any type of device specially configured to perform the functions discussed herein, such as a specially configured desktop computer, laptop computer, tablet computer, notebook computer, cellular phone, smart phone, smart watch, wearable computing device, etc. The computing device 116 may be configured to operate as a blockchain wallet and accordingly have a cryptographic key pair stored therein including a private key and a public key. As part of the reservation of the shared space, the computing device 116 may generate a digital signature using its private key. The computing device 116 may submit a reservation request for use of the shared space to a node 102 in the blockchain network 104 using a suitable communication network and method.

The reservation request may include at least the digital signature, the public key of the computing device's cryptographic key pair, the identifier included in the smart contract for the shared space 106 that is being reserved, and, in some cases, a reservation time. The reservation time may be a time and/or date for which the user 118 wants to reserve the shared space 106. In some embodiments, the terms of the smart contract may include available times and/or dates, which may be updated (e.g., through the use of new smart contracts that are added to the blockchain) when times and/or dates are reserved. In other embodiments, a different smart contract may be added to the blockchain for each time and/or date, where a specific smart contract may be executed to reserve each time and/or date. In such embodiments, the time and/or date may be left out of the reservation request, as the identifier may uniquely identify the smart contract for the time and/or date desired by the user 118. In these embodiments, execution of a smart contract to reserve a time and/or date may prevent any future executions, thus reserving that time and/or date without conflict.

The node 102 may receive the reservation request from the computing device 116. The node 102 may store the reservation request data in a location that is monitored by the smart contracts in the blockchain. In an exemplary embodiment, each reservation request may be added to the blockchain in a new blockchain data value. In some such embodiments, the node 102 may validate the digital signature using the included public key prior to storage of the reservation request in the blockchain. In some such instances, the digital signature may not be stored in the blockchain data value. The smart contract may monitor for reservation requests that include its identifier. When a reservation request is identified, the data included therein may be input into the smart contract as inputs thereof.

The smart contract may determine if all criteria has been satisfied before execution. For instance, the smart contract may determine if the reservation time and/or date is still available, if the reservation request included a valid digital signature (e.g., as determined by the node 102 or the smart contract using the public key), if a public key was included in the reservation request, if the reservation request included an express acceptance of the terms and conditions (e.g., if required; in some cases, the reservation request that includes the identifier may be suitable as acceptance), etc. In cases where payment is required, the smart contract may determine if the reservation request includes confirmation of payment or may otherwise check for payment. For instance, if a blockchain transaction is used for payment, the smart contract may identify if the address included therein has received the correct amount of currency or if any address generated using the smart contract's public key has received the correct amount of currency. In some instances, the reservation request may include a transaction identifier or other value for use by the smart contract in verifying the blockchain transaction. In another example, if a fiat currency transaction is used for payment, the reservation request may include a transaction identifier or other data associated therewith, and/or the smart contract may monitor the transaction account associated with the account number included therein for receipt of the correct amount of fiat currency.

If not all terms and conditions of the smart contract are satisfied, then the smart contract may not execute. In some cases, the user 118 may be informed of the failure through the computing device 116. For example, the smart contract may be configured to self-execute upon failure to satisfy all of the terms and conditions and, as part of the execution, may transmit a notification to the computing device 116 (e.g., or to the node 102 for forwarding to the computing device 116 that submitted the reservation request) indicating that the terms and conditions were not satisfied, and may generate and submit a new smart contract to the node 102 in the blockchain network 104 for storage in a new blockchain data value for the next attempt at reserving the shared space.

Once the terms and conditions are satisfied, then the smart contract may self-execute. Self-execution of the smart contract may include the transmission of the public key included in the reservation request to the internet-enabled device 110 that is associated with the shared space 106 to which the smart contract corresponds. The internet-enabled device 110 may receive the public key and store the public key in a memory therein or otherwise accessible thereto. The internet-enabled device 110 may also be provided with the reservation time as reserved by the user 118 and any other information necessary regarding usage of the shared space 106 (e.g., operation information for utilities, electronics, etc. that may be managed by or otherwise affected using the internet-enabled device 110). For example, the user 118 may request that a projection device in the shared space 106 be turned on for use, where the internet-enabled device 110 may turn the projection device on at the reserved time and/or date.

When the user 118 wants to gain access to the shared space 106, the user 118 may present the computing device 116 to the internet-enabled device 110 at the reserved time and/or date. The computing device 116 may generate a new digital signature using the private key of the cryptographic key pair thereof, which may be electronically transmitted to the internet-enabled device 110 using any suitable communication network and method (e.g., near field communication, Bluetooth, radio frequency, infrared, etc.). The internet-enabled device 110 may receive the digital signature and may validate the digital signature using the public key that was received from the smart contract. Validation of the digital signature may ensure that only the party that submitted the reservation request, or a party authorized thereby, may have access to the shared space 106. If the validation is unsuccessful, access to the shared space 106 may be prohibited. In some cases, the user 118 may be informed of the prevention, such as through the computing device 116 (e.g., following a transmission back to the computing device 116 by the internet-enabled device 110) or the internet-enabled device 110 (e.g., using a display device interfaced therewith).

If the validation is successful, the internet-enabled device 110 may instruct the electronic locking mechanism 112 to open. The user 118 may then be able to enter the shared space 106 via the opened door or other barrier that has been unlocked. In an exemplary embodiment, validation of the digital signature may only be successful during the reserved time and/or date. For example, if the user 118 reserves the shared space 106 for use between 8 and 9 am on Jan. 2, 2019, then validation of the digital signature may always fail if attempted before 8 am on Jan. 2, 2019 or after 9 am on Jan. 2, 2019. Similarly, use of any other electronics or other devices managed by the internet-enabled device 110 may be prohibited once the reservation time and/or date expires.

In some embodiments, a one-time password may be used in place of, or in addition to, the digital signature. In one such embodiment, the reservation request may include a one-time password selected by the user 118. The one-time password may be provided to the internet-enabled device 110 by the smart contract along with the reservation time and/or date. In another such embodiment, the smart contract may generate or otherwise identify a one-time password, which may be provided to the computing device 116 and internet-enabled device 110 as part of the execution of the smart contract. When the user 118 approaches the shared space 106 for access thereto, the one-time password may be supplied to the internet-enabled device 110 in addition to or in place of the digital signature. The one-time password may be submitted directly by the user 118 (e.g., using an input device interfaced with the internet-enabled device 110, such as a keypad) or by the computing device 116 using a suitable electronic transmission. The internet-enabled device 110 may validate the one-time password by checking it against the one-time password provided by the smart contract for a match.

In some embodiments where a blockchain transaction is processed for payment by the blockchain wallet of the computing device 116 to secure use of the shared space 106, the blockchain transaction may be performed as part of the execution of the smart contract. In such an embodiment, the reservation request may include the digital signature of the computing device's blockchain wallet, as well as one or more transaction inputs and cryptographic currency amounts associated therewith. As part of the checking of satisfaction of inputs, the smart contract may validate the digital signature using the computing device's public key and may check that the transaction inputs are valid, are associated with the computing device's blockchain wallet (e.g., through the digital signature and/or public key), are associated with the indicated amounts of currency, and that the total amount of cryptographic currency meets or exceeds the amount required for the reservation. If the smart contract is satisfied, then, as part of the execution of the smart contract, a new blockchain transaction may be processed that includes transfer of the required amount of cryptographic currency from the transaction inputs to the blockchain address associated with the smart contract, with any remainder being provided to a new address for the computing device's blockchain wallet (e.g., generated using the public key thereof, which may be performed by the smart contract or the computing device 116 prior to submission).

The methods and systems discussed herein enable access to a shared space 106 to be controlled through the use of a blockchain and smart contract. The use of blockchain ensures that all interactions are stored in an immutable form that is easily accessible, identifiable, and auditable, which prevents all tampering thereof. In additions, because smart contracts are self-executable, a reservation request can be submitted and processed automatically by the smart contract, which can automatically provide the appropriate data to an internet-enabled device 110 that controls access to the shared space 106. The user 118 is then free to access the shared space 106 at the reserved time through the internet-enabled device 110, where no employees or other personnel needs to be involved. The result is that access to a shared space 106 can be controlled completely automatically, and in a manner that is highly secure and auditable to prevent any nefarious activity and to provide additional security should any conflicts or problems arise.

Blockchain Node

Figure 2:
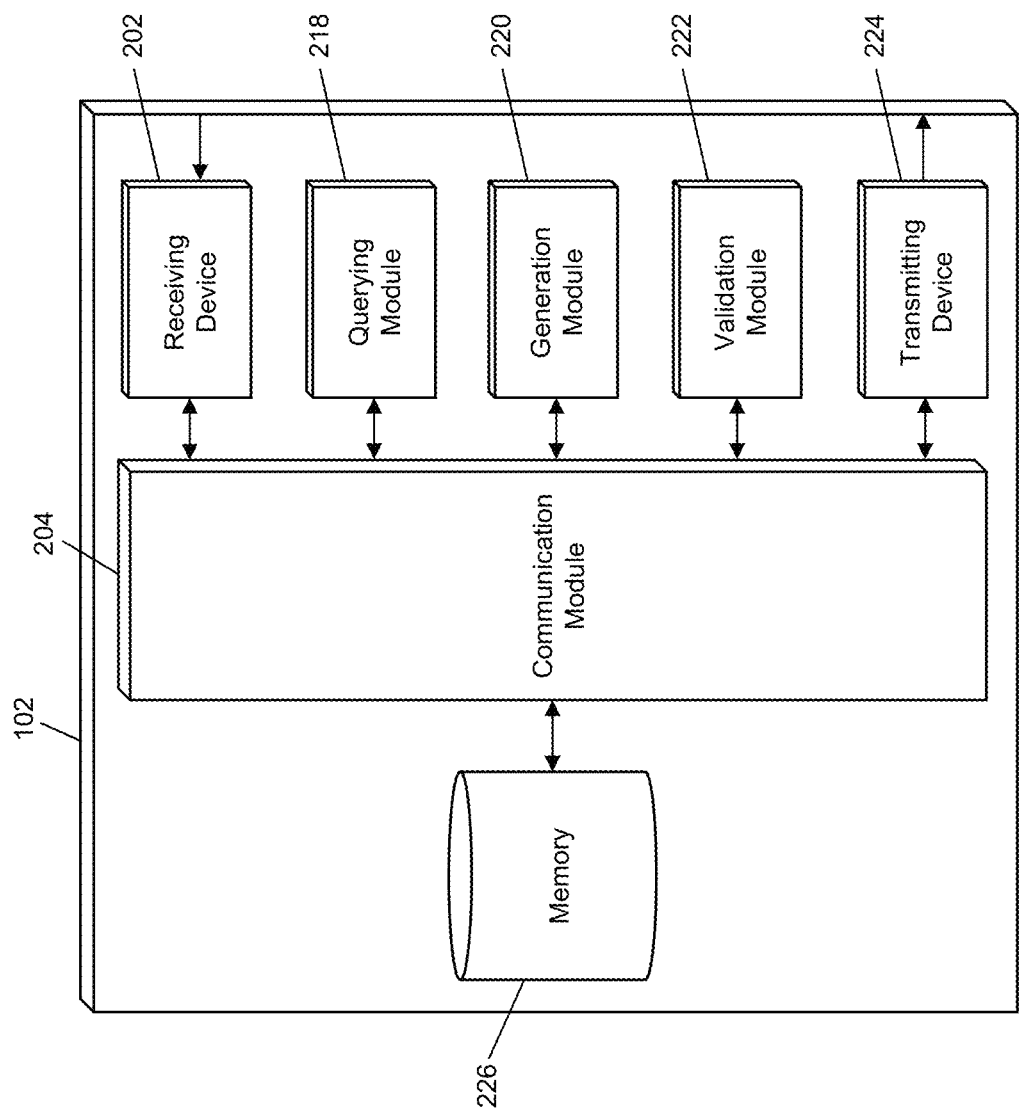
FIG. 2 is a block diagram illustrating a node of the system of FIG. 1 for reserving access to a shared space through blockchain in accordance with exemplary embodiments.

FIG. 2 illustrates an embodiment of a node 102 in the system 100. It will be apparent to persons having skill in the relevant art that the embodiment of the node 102 illustrated in FIG. 2 is provided as illustration only and may not be exhaustive to all possible configurations of the node 102 suitable for performing the functions as discussed herein. For example, the computer system 500 illustrated in FIG. 5 and discussed in more detail below may be a suitable configuration of the node 102.

The node 102 may include a receiving device 202. The receiving device 202 may be configured to receive data over one or more networks via one or more network protocols. In some instances, the receiving device 202 may be configured to receive data from managing systems 108, internet-enabled devices 110, computing devices 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by managing systems 108 and/or internet-enabled devices 110 that are superimposed or otherwise encoded with smart contracts for addition to the blockchain. The receiving device 202 may also be configured to receive data signals electronically transmitted by computing devices 116, which may be superimposed or otherwise encoded with reservation requests, which may include identifiers, digital signatures, public keys, times and/or dates, one-time passwords, and/or any other data discussed herein. The receiving device 202 may also be configured to receive data signals electronically transmitted by other nodes 102 in the blockchain network 104, such as may include new blockchain data values and/or blocks for confirmation and/or addition to the blockchain using traditional methods.

The node 102 may also include a communication module 204. The communication module 204 may be configured to transmit data between modules, engines, databases, memories, and other components of the node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the node 102 and external components of the node 102, such as externally connected databases, display devices, input devices, etc. The node 102 may also include a processing device. The processing device may be configured to perform the functions of the node 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The node 102 may include a querying module 218. The querying module 218 may be configured to execute queries on databases to identify information. The querying module 218 may receive one or more data values or query strings, and may execute a query string based thereon on an indicated database, such as a memory 226 of the node 102 to identify information stored therein. The querying module 218 may then output the identified information to an appropriate engine or module of the node 102 as necessary. The querying module 218 may, for example, execute a query on the memory 226 of the node 102 to identify blockchain data, such as a blockchain data value including a smart contract having an identifier that matches the identifier included in a reservation request, for submission of inputs thereto.

The node 102 may also include a generation module 220. The generation module 220 may be configured to generate data for use by the node 102 in performing the functions discussed herein. The generation module 220 may receive instructions as input, may generate data based on the instructions, and may output the generated data to one or more modules of the node 102. For example, the generation module 220 may be configured to generate new blockchain data values that include received smart contracts, generate new blockchain data values for new blockchain transactions based on reservation requests and/or smart contract executions, generate digital signatures using private keys, generate blockchain addresses using public keys, and generate data as part of the execution of smart contracts, such as one-time passwords.

The node 102 may also include a validation module 222. The validation module 222 may be configured to perform validations and verifications for the node 102 as part of the functions discussed herein. The validation module 222 may receive instructions as input, which may include data to be validated and/or data to be used in the validation. The validation module 222 may perform a validation or verification as requested, and may output a result of the validation to another module or engine of the node 102. The validation module 222 may, for example, validate a digital signature included in a reservation request using a public key included therein, validate transaction inputs as being associated with a blockchain wallet using an accompanying digital signature and/or public key, validate inputs to a smart contract for satisfaction of criteria thereof, etc.

The node 102 may also include a transmitting device 224. The transmitting device 224 may be configured to transmit data over one or more networks via one or more network protocols. In some instances, the transmitting device 224 may be configured to transmit data to managing systems 108, internet-enabled devices 110, computing devices 116, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to managing systems 108 and/or internet-enabled devices 110 that are superimposed or otherwise encoded with outputs from the execution of a smart contract, which may include a public key, reservation time and/or date, one-time password, instructions regarding usage of utilities, electronics, or other devices, etc. The transmitting device 224 may also be configured to electronically transmit data signals to computing devices 116, which may be superimposed or otherwise encoded with notification messages regarding shared space 106 reservations, one-time passwords, transaction identifiers, etc. The transmitting device 224 may also be configured to electronically transmit data signals to other nodes 102 in the blockchain network 104, which may include new blockchain data values or blocks for confirmation or addition to the blockchain.

The node 102 may also include a memory 226. The memory 226 may be configured to store data for use by the node 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the node 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices 116 and internet-enabled devices 110, smart contract executable rules, signature generation and validation algorithms, etc.

Process for Controlling Shared Space Access

Figure 3:
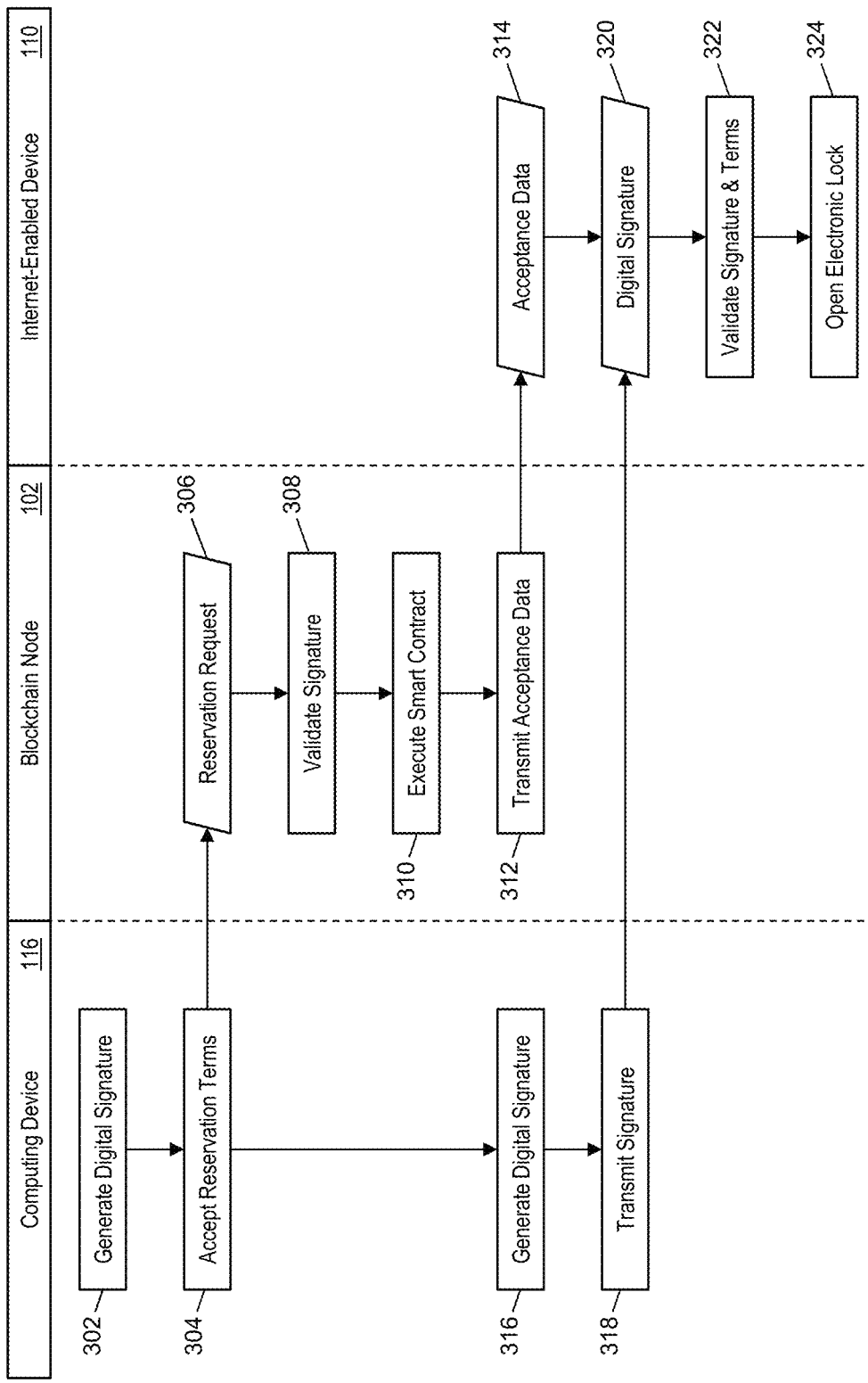
FIG. 3 is a flow diagram illustrating a process for reserving access to a shared space through use of blockchain and smart contracts in the system of FIG. 1 in accordance with exemplary embodiments.

FIG. 3 illustrates an example process for controlling access to the shared space 106 in the system 100 of FIG. 1 using a blockchain and smart contracts as performed by the node 102 and the user's computing device 116.

In step 302, the computing device 116 may generate a digital signature using a private key of its cryptographic key pair using a suitable signature generation algorithm. In step 304, the computing device 116 may accept the terms and conditions for reservation of the shared space by submitting a reservation request to the node 102 using a suitable communication network and method. In step 306, the receiving device 202 of the node 102 may receive the reservation request from the computing device 116. The reservation request may include at least the digital signature, the public key of the computing device's cryptographic key pair, the reservation time and/or date requested by the user 118, and the identifier associated with the smart contract for reservation of the shared space 106.

In step 308, the validation module 222 of the node 102 may validate the digital signature in the reservation request using the public key included therein and the signature generation algorithm. In step 310, node 102 may input the reservation request data into the smart contract as inputs, which may verify that all of the criteria for the smart contract has been satisfied and may self-execute the smart contract. As part of the execution of the smart contract, in step 312, the transmitting device 224 of the node 102 may electronically transmit acceptance data to the internet-enabled device 110. The acceptance data may include at least the reservation time and/or date and the public key included in the reservation request. In step 314, the internet-enabled device 110 may receive the acceptance data.

In step 316, the computing device 116 may generate a new digital signature prior to entering the shared space 106 using the private key of its cryptographic key pair. In step 318, the computing device 116 may electronically transmit the new digital signature to the internet-enabled device 110 using a suitable communication network and method. In step 320, the internet-enabled device 110 may receive the new digital signature. In step 322, the internet-enabled device 110 may validate the digital signature using the public key included in the acceptance data, and may also validate that all of the agreed-to terms and conditions of the reservation are being complied with, such as that a current time and date is within the reservation time and date. If the validations are successful, then, in step 324, the internet-enabled device 110 may instruct the electronic locking mechanism 112 to open, enabling the user 118 to access the shared space 106.

Exemplary Method for Reserving Access to a Shared Space

Figure 4:
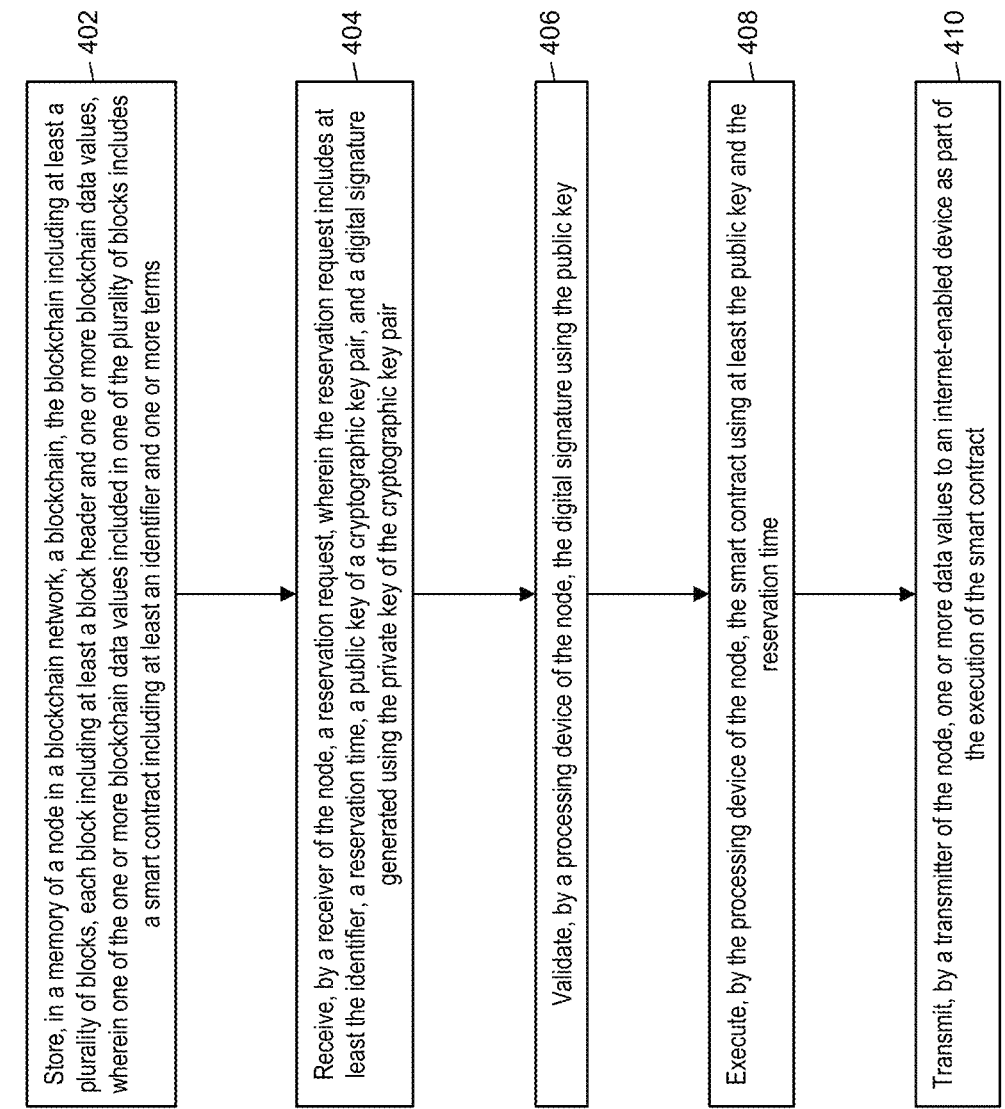
FIG. 4 is a flow chart illustrating an exemplary method for reserving access to a shared space through use of a blockchain and smart contracts in accordance with exemplary embodiments.

FIG. 4 illustrates a method 400 for reserving access to a shared space through the use of a blockchain and smart contracts.

In step 402, a blockchain may be stored in a memory (e.g., the memory 226) of a node (e.g., the node 102) in a blockchain network (e.g., the blockchain network 104), the blockchain including at least a plurality of blocks, each block including at least a block header and one or more blockchain data values, wherein one of the one or more blockchain data values included in one of the plurality of blocks includes a smart contract including at least an identifier and one or more terms. In step 404, a reservation request may be received by a receiver (e.g., the receiving device 202) of the node, wherein the reservation request includes at least the identifier, a reservation time, a public key of a cryptographic key pair, and a digital signature generated using the private key of the cryptographic key pair.

In step 406, the digital signature may be validated by a processing device (e.g., the validation module 222) of the node using the public key. In step 408, the smart contract may be executed by the processing device of the node using at least the public key and the reservation time. In step 410, one or more data values may be transmitted by a transmitter (e.g., the transmitting device 224) of the node to an internet-enabled device (e.g., the internet-enabled device 110) as part of the execution of the smart contract.

In one embodiment, the one or more data values may include the public key. In a further embodiment, the method 400 may also include: receiving, by a receiver (e.g., the receiving device 202) of the internet-enable device, a new digital signature from a computing device; validating, by a processing device of the internet-enabled device, the new digital signature using the public key; and opening, by the internet-enabled device, an electronic lock (e.g., the electronic locking mechanism 112) interfaced with the internet-enabled device to provide access to a shared space (e.g., the shared space 106). In some embodiments, the one or more data values may include a one-time password. In a further embodiment, the method 400 may further include: receiving, by a receiver of the internet-enabled device, the one-time password from a computing device; and opening, by the internet-enabled device, an electronic lock interfaced with the internet-enabled device to provide access to a shared space.

In one embodiment, the one or more data values may include the reservation time. In a further embodiment, the method 400 may also include opening, by the internet-enabled device, an electronic lock interfaced with the internet-enabled device to provide access to a shared space based on the reservation time. In some embodiments, the method 400 may further include processing, by the processing device of the node, a blockchain transaction for payment of a reservation amount to a recipient address, the blockchain transaction including one or more transaction inputs, wherein the recipient address is generated by the processing device of the node using a public key included in the smart contract, and the reservation request further includes the one or more transaction inputs.

Computer System Architecture

Figure 5:
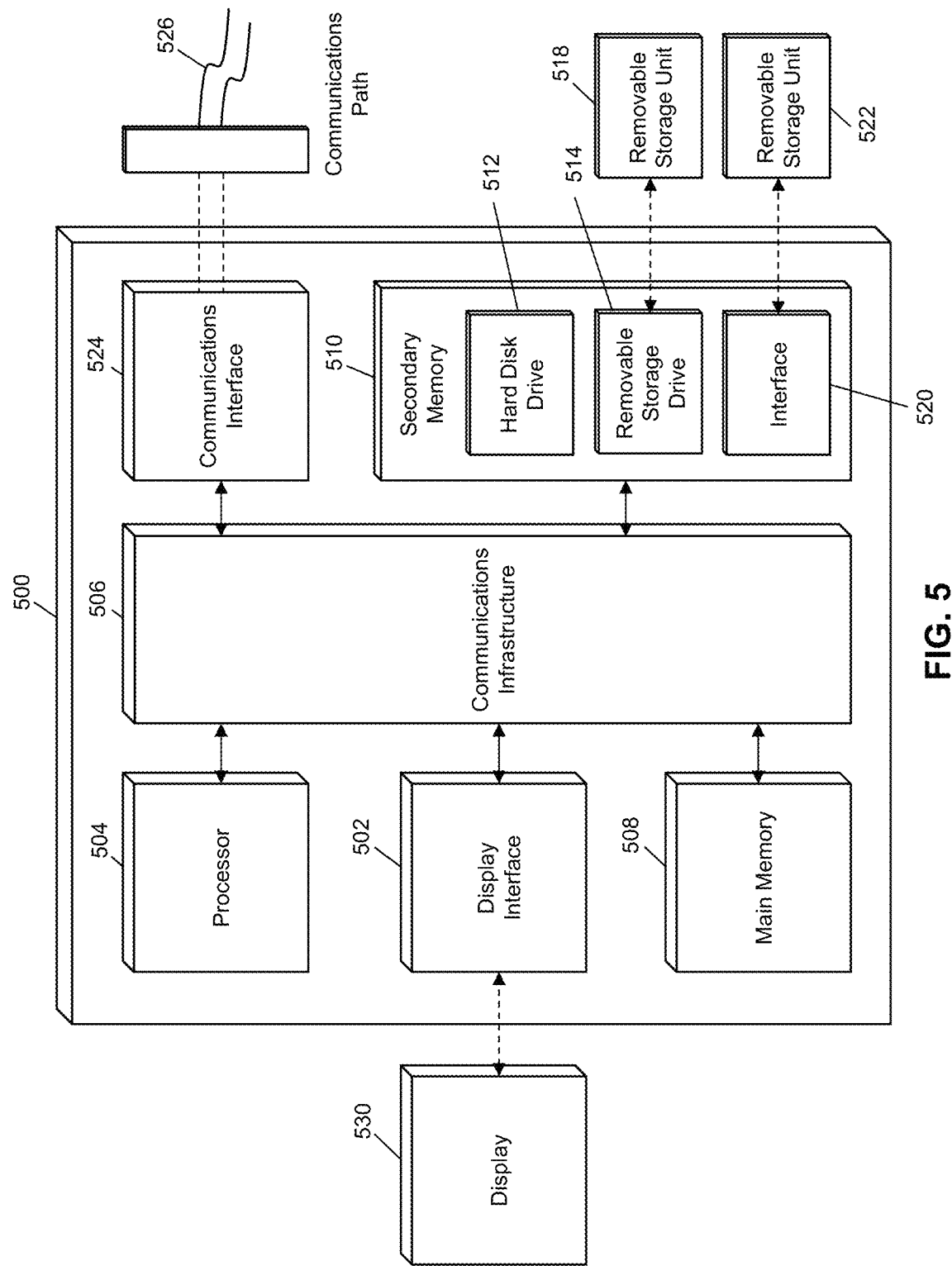
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the node 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for reserving access to a shared space through use of a blockchain and smart contracts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for reserving access to a shared space through use of a blockchain and smart contracts, comprising:
storing, in a memory of a node in a blockchain network, a blockchain including at least a plurality of blocks, wherein one of the plurality of blocks includes (i) a smart contract including at least an identifier associated with the shared space and setting out one or more terms and conditions for use of the shared space including at least available times and dates for the shared space, and (ii) a one-time password selected by a user;
receiving, by a receiver of the node in the blockchain network, a reservation request from a mobile device of the user, wherein the reservation request includes at least the identifier associated with the shared space, a reservation time, a public key of a cryptographic key pair associated with the mobile device of the user, and a digital signature generated by the mobile device of the user using the private key of the cryptographic key pair;
upon determining that the one or more terms and conditions for use of the shared space are satisfied, self-executing, by the processing device of the node in the blockchain network, the smart contract using at least the public key and the reservation time received in the reservation request from the mobile device;
as part of the self-execution of the smart contract, transmitting, by a transmitter of the node in the blockchain network, to an internet-enabled device that controls access to the shared space, at least the public key of the cryptographic key pair associated with the mobile device of the user and the reservation time included in the received reservation request;

processing, by the processing device of the node in the blockchain network, a blockchain transaction for payment of a reservation amount to a recipient address and including the blockchain transaction in a new block;

in response to the user presenting the mobile device to the internet-enabled device, receiving, by the internet-enabled device, from the mobile device of the user, a new digital signature generated by the mobile device using the private key of the cryptographic key pair; and determining, by the internet-enabled device, validation of the new digital signature generated by and received from the mobile device of the user using the public key of the cryptographic key pair associated with the mobile device received from the node in the blockchain network;

determining, by the internet-enabled device, validation of the one-time password;

determining, by the internet-enabled device that a current time and date is within the reservation time received from the node in the blockchain network;

enabling, by the internet-enabled device, access to the shared space when (i) validation of the digital signature is successful, (ii) the current time and date is within the reservation time, and (iii) when the one-time password is validated, and denying, by the internet-enabled device, access to the shared space when (i) validation of the digital signature is unsuccessful, (ii) the current time and date is not within the reservation time, and/or (iii) the one-time password is not validated.

2. The method of claim 1, wherein enabling access to the shared space includes opening, by the internet-enabled device, an electronic lock interfaced with the internet-enabled device.

3. The method of claim 1, wherein each block in the blockchain includes at least a block header and one or more blockchain data values and wherein the one or more data values includes the one-time password.

4. The method of claim 1, further comprising:
receiving, by a receiver of the internet-enabled device, the one-time password from the computing device; and
opening, by the internet-enabled device, an electronic lock interfaced with the internet-enabled device to provide access to the shared space.

5. The method of claim 1, wherein the blockchain transaction includes one or more transaction inputs,
the recipient address is generated by the processing device of the node using the public key included in the smart contract, and
the reservation request further includes the one or more transaction inputs.

6. A system for reserving access to a shared space through use of a blockchain and smart contracts, comprising:
a memory of a node in a blockchain network configured to store a blockchain including at least a plurality of blocks, wherein one of the plurality of blocks includes (i) a smart contract including at least an identifier associated with the shared space and setting out one or more terms and conditions for use of the shared space including at least available times and dates for the shared space, and (ii) a one-time password selected by a user;
a receiver of the node in the blockchain network configured to receive a reservation request from a mobile device of the user, wherein the reservation request includes at least the identifier associated with the shared space, a reservation time, a public key of a cryptographic key pair associated with the mobile device of the user, and a digital signature generated by the mobile device of the user using the private key of the cryptographic key pair;
a processing device of the node in the blockchain network configured to
self-execute, upon determining that the one or more terms and conditions for use of the shared space are satisfied, the smart contract using at least the public key and the reservation time received in the reservation request from the mobile device; and
a transmitter of the node in the blockchain network configured to transmit, as part of the self-execution of the smart contract, to an internet-enabled device that controls access to the shared space, at least the public key of the cryptographic key pair associated with the mobile device of the user and the reservation time included in the received reservation request,
wherein the processing device of the node in the blockchain network processes a blockchain transaction for payment of a reservation amount to a recipient address and including the blockchain transaction in a new block;
wherein, in response to the user presenting the mobile device to the internet-enabled device, the internet-enabled device
receives, from the mobile device of the user, a new digital signature generated by the mobile device using the private key of the cryptographic key pair,
determines validation of the new digital signature generated by and received from the mobile device of the user using the public key of the cryptographic key pair associated with the mobile device received from the node in the blockchain network,
determines validation of the one-time password,
determines that a current time and date is within the reservation time received from the node in the blockchain network,
enables access to the shared space when (i) validation of the digital signature is successful, (ii) the current time and date is within the reservation time, and (iii) the one-time password is validated, and
denies access to the shared space when (i) validation of the digital signature is unsuccessful, (ii) the current time and date is not within the reservation time, and/or (iii) the one-time password is not validated.

7. The system of claim 6, wherein an electronic lock interfaced with the internet-enabled device is configured to open to provide access to the shared space.

8. The system of claim 6, wherein each block in the blockchain includes at least a block header and one or more blockchain data values and wherein the one or more data values includes the one-time password.

9. The system of claim 6, further comprising:
a receiver of the internet-enabled device configured to receive the one-time password from the computing device; and
an electronic lock interfaced with the internet-enabled device configured to open to provide access to the shared space.

10. The system of claim 6, wherein
the blockchain transaction includes one or more transaction inputs, the recipient address is generated by the processing device of the node using public key included in the smart contract, and the reservation request further includes the one or more transaction inputs.

\* \* \* \* \*